Aug. 3, 1937.                C. H. HOFFSTETTER ET AL            2,088,957
                                  STOVE AND RANGE
                     Filed Jan. 4, 1937          2 Sheets-Sheet 2
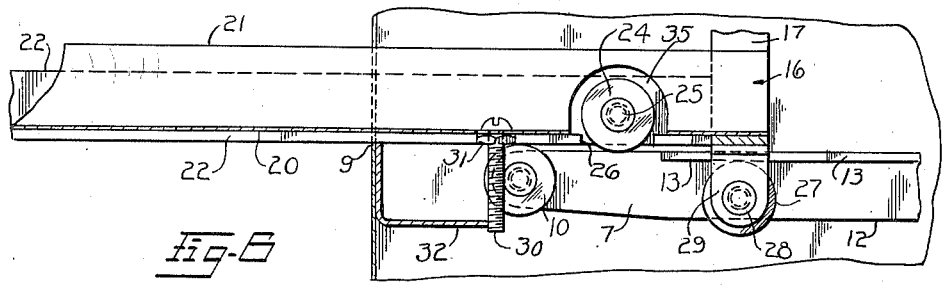
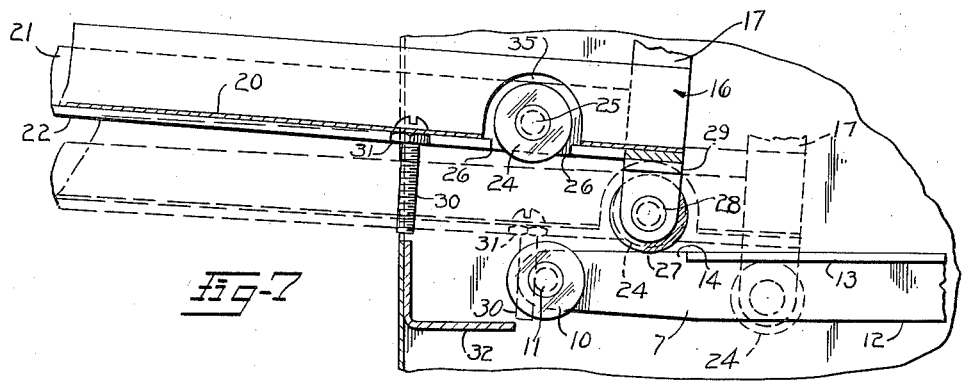
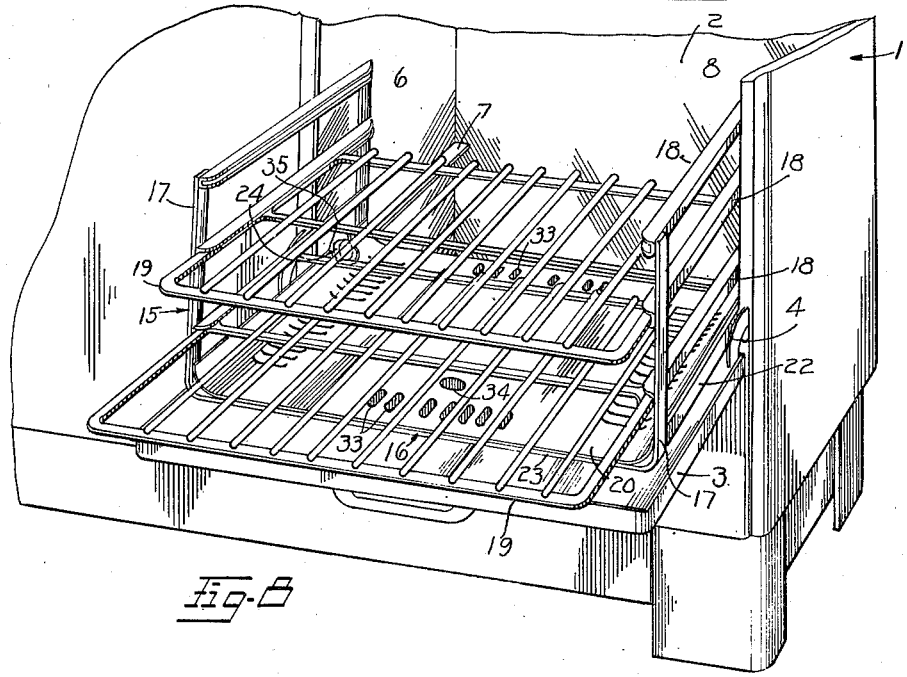
INVENTORS
Carl H. Hoffstetter and
Robert F. Hoffstetter
BY
Fisher, Moser & Moore
ATTORNEYS Patented Aug. 3, 1937

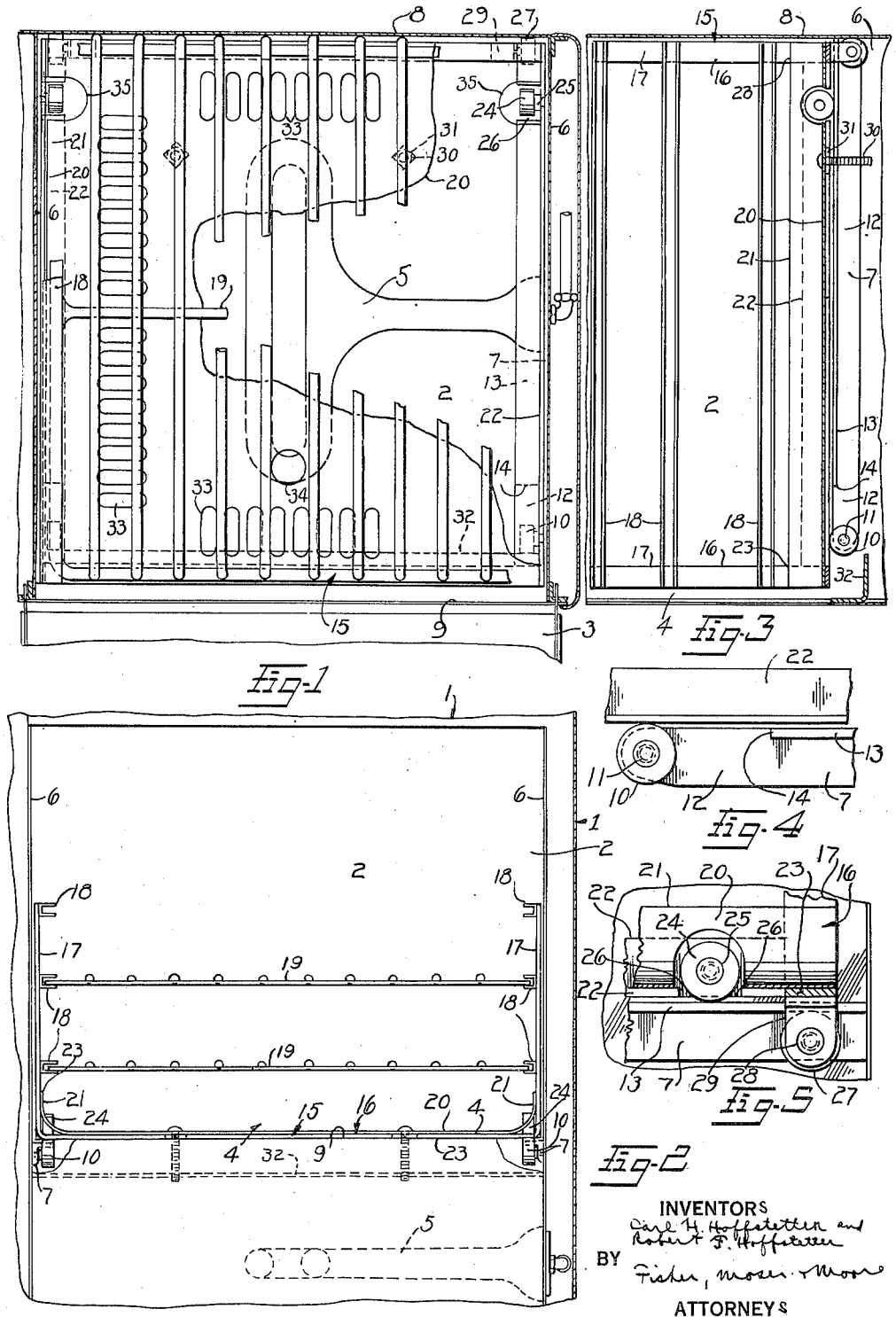

2,088,957

UNITED STATES PATENT OFFICE 2,088,957

STOVE AND RANGE

Carl H. Hoffstetter and Robert F. Hoffstetter, Erie, Pa.

Application January 4, 1937, Serial No. 119,031

2 Claims. (Cl. 126—339)

Our invention relates to stoves and ranges, and has for its object to provide a frame or rack having a bottom wall which functions as the bottom of the oven when the rack is in normal cooking position within the oven, the rack being slidably mounted to permit moving it out of the oven for convenience in placing cooking vessels in position on the rack or removing the same therefrom.

A further object of the invention is to provide a simple and effective means for slidably mounting the rack for movement into and partly out of the oven whereby the rack can be conveniently installed or assembled and as conveniently disconnected or removed for repair or to permit easy access to the oven burner.

Other objects and advantages will be apparent as the description is considered in connection with the accompanying drawings, in which:

Figure 1 is a plan view of an oven partly broken away showing the framework and runners for the removable rack;

Figure 2 is a front view of an oven, partly broken away, with door open showing the rack in relation to the burner and runners;

Figure 3 is a side view of the oven and rack partly in section showing the runners and rollers which facilitate operation of the rack;

Figure 4 is a fragmentary side view of the rack runners and stationary front rollers;

Figure 5 is a fragmentary side view of the rack runners and movable rollers;

Figure 6 is a fragmentary side view of the rack runners in forward position with stop screws adjacent to the combined baffle plate and stop member;

Figure 7 is a fragmentary side view of the rack runners in the respective positions assumed during assembly and removal of the rack from the oven; and Figure 8 is a perspective view of the oven showing the rack in withdrawn position.

Referring more particularly to the drawings, the numeral 1 represents a stove or range, a gas fuel range being shown for purposes of illustration, it being understood that the invention is applicable to coal, electric or other types of stoves. The stove 1 is provided with an oven 2, closed by a door 3, pivotally hinged at its lower end in any suitable manner for swinging movement about a horizontal axis. This oven is open at its lower end to the atmosphere and mounted therein, below the level of the oven door opening 4 is an oven burner 5.

Attached to each of the side walls 6 of the oven is a horizontally disposed angle iron runner or track 7 extending from the rear oven wall 8 to a point adjacent the front frame 9. These runners carry rollers 10, journaled on studs 11 fixed to the forward ends of vertical side flanges 12. The horizontal flanges 13 of these runners are cut away at their forward ends to provide openings 14 through which the periphery of the rollers extend, the latter being on a plane slightly above the top face of the horizontal flanges 13 for a purpose presently described.

Slidably mounted in the oven 2 is a rack 15 comprising a pair of spaced substantially U-shaped frame members 16, to the upright portions 17 of which stepped ledges 18 are connected in any suitable manner, such as welding. These ledges, are preferably of U-shape for slidably receiving grids or racks 19 adapted to support pots and pans or the like. The bottom of the rack 15 consists of a reticulated metal sheet or plate 20, which may be welded or otherwise secured at its curved side edges 21 to angle iron frame members 22, in turn connected at opposite ends to the U-shaped frame members 16, at the point of juncture of the upright portions 17 with the horizontal portions 23 thereof. If desired the bottom plate 20 of the rack 15, which also serves as the oven bottom, may be slidably or removably supported on the rack frame members 16 and 22, so that access may be had to the oven burner 5, without the necessity of completely removing the rack 15. In that case it would be necessary to cut away or slot the bottom plate at the rear of rollers 24. The angle frame members 22 are engaged by and afford a snug sliding seat for the curved side edges of the bottom plate or oven bottom 20.

A pair of rollers 24 are mounted on stud shafts 25 secured to each of the vertically disposed flanges of the frame members 22 of the rack 15, adjacent the rear ends of the latter, the curved side edges of the bottom member being cut away as at 35 to accommodate the rollers. The peripheries of these rollers protrude through slots 26 formed in the horizontal flanges of these members 22 for engagement with the top faces of the runners 7. The rack 15 carries another pair of rollers 27 which engage the under faces of the runners 7 and cooperate with the rollers 24 in facilitating movement of the rack through the oven door opening. Thus brackets 29 are welded or otherwise secured to the under side of the rearwardmost U-shaped frame member 16, at opposite sides thereof, and depend therebeneath a sufficient distance to support the rollers 27 in engagement with the runners. The rollers 27 are journaled on the brackets 29 by means of stud shafts 28. Stop screws 30 extending downwardly through the bottom plate 20 somewhat in advance of the rollers 24, and locked in place by nuts 31, prevent the rack from being accidentally pulled completely out of the oven. Thus when the rack reaches Figure 6 position, the screws 30 contact the forward edge of a baffle plate 32. In addition to serving as a stop for the screws 30, the baffle plate deflects the heat flowing upwardly through the front hot air openings 33 in the bottom plate and prevents overheating of the oven door. It also minimizes the loss of heat. A large opening 34, in the bottom plate is used for lighting the oven burner 5.

In order to assemble the rack 15 in operative or Figure 6 position within the oven, it is necessary to tilt the forward end upwardly with the rollers 27 suspended over the openings 14 in the flanges 13 of runners 7 and to lower the rear end of the rack until the rollers 27 pass down through these openings 14. The rack is then pushed rearwardly while in this slightly tilted position, until the rearward set of rack rollers 27 pass beneath and engage the under face of runner flange 13, as shown in dotted lines in Figure 7 of the drawings. At the same time the forward end of the rack is lowered until the rack assumes its horizontal or Figure 6 position. Continued rearward movement of the rack will now cause the forward set of rack rollers 24 to ride on the flanges 13 of runners 7 while the peripheries of rollers 27 will bear against the under face of this flange. The rack frame angle members 22 engage and are slidably supported on the rollers 10 during this and other normal movements of the rack. To remove the rack for repairs or for other purposes it is merely necessary to reverse the movements just described.

From the foregoing it will be noted that the rollers 24 and 27 steady the rack in its to and fro movements and maintain the rack frame members 22 and the runners 7 out of contact with each other, while the upper periphery of rollers 10, are in a plane slightly above that occupied by the lower periphery of the rollers 27 so as to support the forward portion of the cage.

What we claim is:

1. In a cooking range, an oven open at its front end, angle runners secured to the side walls of said oven, a rack comprising U-shaped members, horizontally disposed angle frame members connected at opposite ends to said U-shaped members, an oven bottom supported on said rack and having curved side edges adapted to snugly seat on said angle frame members, said angle runners having their horizontal flanges cut away at their forward ends to form openings, rollers secured to the forward ends of the vertical flanges of said runners and projecting upwardly through said openings for engagement with the under face of one flange of the said angle frame members, rollers depending from the rear end of said frame adapted to be inserted downwardly through said openings for engagement beneath the horizontal flanges of said runners, said angle frame members and said bottom having registering openings, rollers secured to said angle frame members and extending downwardly through said last mentioned openings for engagement with the top face of said runners.

2. In a cooking range, an oven open at its front end, said oven comprising a rear wall and side walls and being open to the atmosphere at its bottom, horizontally disposed angle runners secured to the said side walls, the horizontal flanges of said runners being cut away at their forward ends to provide openings, rollers secured to the forward ends of the vertical flanges of said runners and projecting upwardly through said openings, a rack comprising spaced front and rear substantially U-shaped members and a pair of angle frame members connected at opposite ends to said U-shaped members, a reticulated bottom member supported on said frame members, said bottom member and said frame members having registering openings, a pair of rollers secured to said frame members and depending through said openings and engaging the top faces of the horizontal flanges of said runners, and a pair of rollers secured to the rear of said rack for engagement with the under faces of the horizontal flanges of said runners, said rollers on said runners engaging the under faces of said frame members.

CARL H. HOFFSTETTER.
ROBERT F. HOFFSTETTER.